United States Patent [19]
Vestergaard et al.

[11] Patent Number: 5,884,651
[45] Date of Patent: Mar. 23, 1999

[54] VALVE AND ASSOCIATED SOLDERING METHOD

[75] Inventors: Anders Vestergaard, Sydals; Jens Jørn Hansen; Henrik Thomas Denning, both of Nordborg, all of Denmark

[73] Assignee: Danfoss A/S, Nordborg

[21] Appl. No.: 596,276

[22] PCT Filed: Aug. 22, 1994

[86] PCT No.: PCT/DK94/00313

§ 371 Date: Feb. 8, 1996

§ 102(e) Date: Feb. 8, 1996

[87] PCT Pub. No.: WO95/06218

PCT Pub. Date: Mar. 2, 1995

[30] Foreign Application Priority Data

Aug. 23, 1993 [DE] Germany ............... 43 28 317.9

[51] Int. Cl.$^6$ ............... F16K 43/00; B23K 1/04; B23K 31/02
[52] U.S. Cl. ............... 137/15; 29/890.131; 137/315; 138/142; 219/85.1; 219/85.22; 228/214
[58] Field of Search ............... 29/890.124, 890.129, 29/890.131, 402.12, 402.16; 137/15, 315, 318; 219/121.64, 85.1, 85.2, 85.22; 228/214, 222; 138/109, 140, 142, 144

[56] References Cited

U.S. PATENT DOCUMENTS

| 2,763,282 | 9/1956 | Reedy et al. ............... 137/318 |
| 3,188,724 | 6/1965 | Bates et al. ............... 29/890.129 |
| 3,937,245 | 2/1976 | Christie ............... 137/318 |
| 4,477,955 | 10/1984 | Becker et al. ............... 29/890.124 |
| 4,573,497 | 3/1986 | White ............... 137/625.29 |
| 4,601,087 | 7/1986 | Kawai et al. ............... 29/890.129 |
| 4,813,590 | 3/1989 | Deakin ............... 228/222 |
| 5,098,010 | 3/1992 | Carmichael et al. ............... 228/214 |
| 5,557,837 | 9/1996 | Thaird-Laforet et al. ............... 29/402.16 |

*Primary Examiner*—George L. Walton
*Attorney, Agent, or Firm*—Lee, Mann, Smith, McWilliams, Sweeney & Ohlson

[57] ABSTRACT

A valve, which has heat-sensitive parts, has at least one connecting tube to which a pipe is arranged to be soldered using local heating. The connecting tube consists of a material of such low thermal conductivity that the heat-sensitive parts remain below the limit temperature as the heat required for soldering is applied. No cooling measures are therefore needed while the pipe is being joined by soldering.

6 Claims, 1 Drawing Sheet

VALVE AND ASSOCIATED SOLDERING METHOD

BACKGROUND OF THE INVENTION

The invention relates to a valve, having parts that are heat-sensitive above a limit temperature, a housing and at least one connecting tube to which a pipe is arranged to be soldered using local heating, and to a method for producing such a soldered joint.

In refrigeration systems, materials processing systems and similar systems, it is usual to join the expansion valves, magnetic valves, check valves and so on to their associated pipework by soldering. Copper pipes are used extensively for this pipework. The connecting tubes of the valves also consist of copper or a similar material. So that the heat-sensitive parts of the valve, for example, plastics parts, O-rings or a vapour, liquid or solid filling used in the valve are not damaged as the pipes are soldered together, previously, cooling had to be effected during the soldering operation. It is therefore usual to position so-called "cooling tongs" next to the soldering point, or to wrap the valve housing in a damp cloth so that the valve housing does not become too hot.

The invention is based on the problem of simplifying the soldering operation.

This problem is solved according to the invention in that the connecting tube consists of a material of such low thermal conductivity that the heat-sensitive parts remain below the limit temperature as the heat required for soldering is applied.

SUMMARY OF THE INVENTION

When using such a connecting tube, it is possible to dispense with cooling through the use of cooling tongs, a damp cloth or similar means during the soldering operation. The connecting tube prevents the flow of heat to such a significant degree that the soldering operation has ended before the heat-sensitive parts have reached an inadmissibly high temperature. This effect can be yet further enhanced by the dimensions of the connecting tube (wall thickness, length).

The connecting tube advantageously consists of a material having a thermal conductivity below 80 W/°K·m. Since the thermal conductivity of copper is 395 W/°K·m, the thermal conductivity is reduced to a fifth or less.

In particular, the connecting tube may consist of stainless steel. Stainless steel is a recognized construction material and has a thermal conductivity of only 15 W/°K·m, and is therefore especially suitable for the present purpose.

If the material of low thermal conductivity has relatively poor soldering properties, it is advisable for the connecting tube to be of hollow-cylindrical construction at its free end, and to carry a layer of solder on its face facing the pipe to be pushed into or onto it. The layer of solder which, when copper pipes are to be joined by soldering, expediently also consists of copper, ensures that the pipe is joined to the solder layer on the connecting tube in a firm and sealed manner by means of the solder that is supplied. A solder layer thickness of the order of 10 to 100 $\mu$m is adequate, which impairs the overall thermal conductivity of the connecting tube only slightly even when the solder layer material has a good thermal conductivity.

It is already known from U.S. Pat. No. 4,415,187 to provide steel containers and other steel components of a refrigeration system with a tubular connecting tube of steel. To join on a copper pipe by soldering, the inner wall of the connecting tube is provided in the region of its free end with a soldered-in copper sleeve. No references are made to valves with heat-sensitive parts or to the exploitation of the low thermal conductivity of the steel.

It is furthermore advisable for the connecting tube to have a flange with which it is soldered to the housing. The flange provides a large-area soldering point which enables the wall thickness of the connecting tube to be less than when the connecting tube is being soldered into an opening of the housing.

It is especially advantageous for the connecting tube to be a deep-drawn part. Deep drawing allows much thinner wall thicknesses to be produced than a machining operation. Thermal conduction through the connecting tube can therefore be yet further reduced.

In a preferred embodiment, provision is made for the housing to consist of the same material of low thermal conductivity as the connecting tube. The low thermal conductivity of the housing is added to the low thermal conductivity of the connecting tube so that the risk of damage to the heat-sensitive parts is even further reduced.

A method for producing a soldered joint between a valve connecting tube and a pipe is characterized according to the invention in that at least one connecting tube of a material of low thermal conductivity is soldered to the housing, the heat-sensitive parts are then introduced and finally the pipe is soldered to the connecting tube. In this process, the heat-sensitive parts are not affected during the first soldering operation because they have not yet been built in, and they are not affected during the second soldering operation because they are protected by the low thermal conductivity of the connecting tube.

It is especially recommended to deep draw the connecting tube from a blank coated on one side with a layer of copper. Apart from the advantage that this process produces a thin-walled connecting tube, there is the further advantage that the solder layer is fixedly joined to the connecting tube material.

BRIEF DESCRIPTION OF THE DRAWINGS

The invention is explained in detail hereinafter with reference to a preferred embodiment illustrated in the drawing, in which.

BRIEF DESCRIPTION OF THE INVENTION

Figure 1:
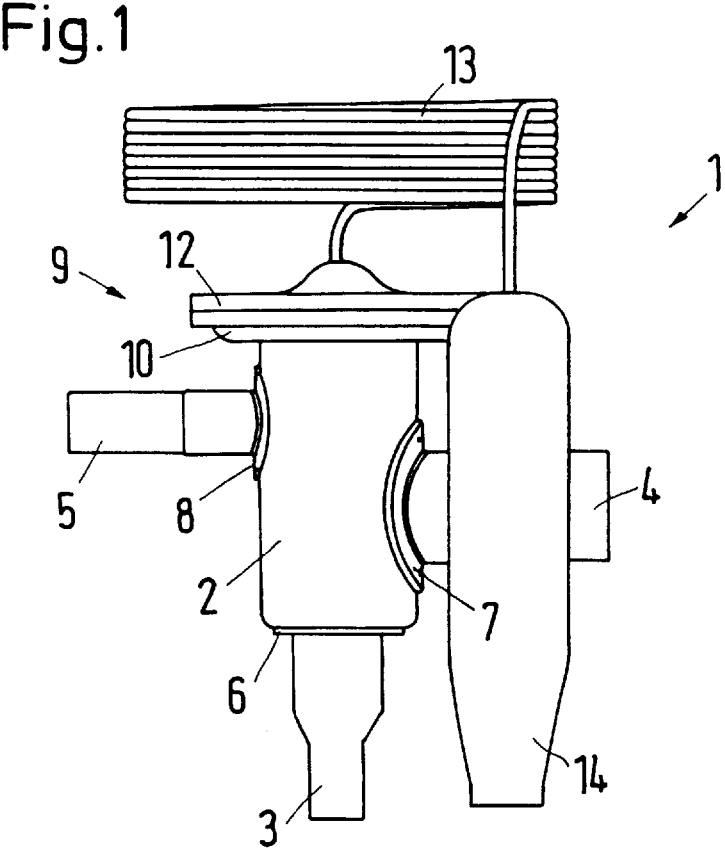
FIG. 1 shows the side view of a valve according to the invention.

The valve 1 illustrated is an expansion valve for a refrigeration system. It comprises a housing 2 with three connecting tubes, namely a connecting tube 3 for the incoming liquid coolant, a connecting tube 4 for the outgoing coolant in vapour form, and a connecting tube 5 for connection to a sensor line. All the connecting tubes have an external flange 6, 7 and 8, with which they are soldered to the outside of the housing to form a large-area seal. One end of the housing 2 is closed by a diaphragm chamber 9, the base ring 10 of which is soldered to an external flange 11 of the housing 2. A cover plate 12 of the diaphragm chamber is connected by way of a capillary tube 13 to a sensor 14. The diaphragm 15 is therefore pressurized from above by the pressure owing to evaporation of the fluid in the sensor 14 and is pressurized from below by the pressure of the refrigerant, which is detected at the connecting tube 5, and by a spring, not illustrated.

All the parts of the valve 1 shown in FIG. 1 consist of stainless steel having a very low carbon content of, for example, 0.06% or less. Here, the housing 2 and connecting tubes 3, 4 and 5 are in the form of deep-drawn parts, whilst the base ring 10 and the cover 12 are stamped parts. For example, a steel by the DIN norm 17441 with the name X2CrNiMo17132 (old name X2CrNiMo1810) is used, the nickel content of which improves the deep-drawing and soldering properties and the low carbon content of which in combination with the molybdenum proportion counteracts corrosion associated with splitting and corrosion associated with stress. Such a stainless steel is known to be acid-and sea-water-resistant. Another example of a steel that can be used is X2CrNi1911 (DIN norm 17441) which is known as a common stainless steel.

Figure 2:
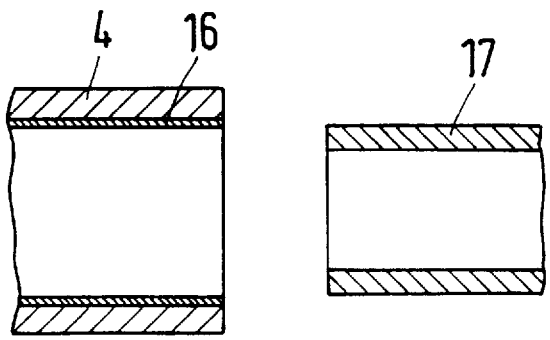
FIG. 2 shows the connecting tube and copper pipe in the process of being joined together.
Figure 3:
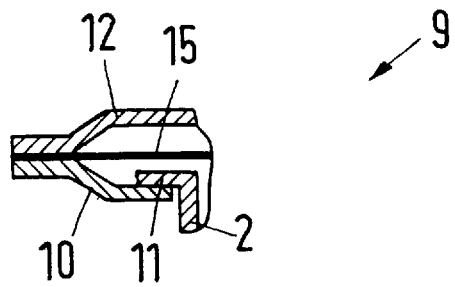
FIG. 3 shows a partial cross-section through the diaphragm chamber.

Using the example of the connecting tube 4, FIG. 2 shows that the inside of the connecting tube is provided with a solder layer 16 of copper. The material of the solder layer had already been applied to the steel blank from which the connecting tubes 3, 4 and 5 were deep-drawn. The starting point can be a relatively thin blank, for example 0.75 mm thick, of copper-plated stainless steel having a copper layer thickness of 10 to 100 $\mu$m. The solder layer therefore extends from the free end of the connecting tube to the side of the flanges 6, 7 and 8 to be joined by soldering. Soldering can be effected in a furnace at relatively high temperatures, for example at 1000° C.

If a copper pipe 17 is inserted into the connecting tube 4 and is soldered there, the solder layer 16 facilitates this process. A customary solder can be used, for example, a copper solder to which 15% silver has been added, marketed under the trade name Silfoss 15. This solder fuses at about 700° C. This temperature can be achieved without problems at the free end of the connecting tube in question using a welding torch.

This high temperature does not have any detrimental effect on the heat-sensitive parts of the valve because the low thermal conductivity of the connecting tube and the housing prevents this. The diaphragm chamber 9, for example, provided with its filling, is extremely temperature-sensitive. Its limit temperature is only 100° C.

In the manufacture of such a valve, the deep-drawn housing 2 is joined by soldering to the base plate 10 and the three connecting tubes 3, 4 and 5. The parts to be built in are then introduced into the valve housing 2 and finally the diaphragm chamber 9 is completed by putting into position the diaphragm and the cover 12, which is connected to the sensor 14 by way of the capillary tube 13. The heat-sensitive filler is then introduced into the sensor system. The valve is then ready for use. It is joined to the connection pipes 17 on site by introducing the latter into the connecting tubes or pushing the connecting tubes onto the connection pipes, and finally soldering these together.

The parts to be built in can also be introduced from below into the housing 2. Only then is the connecting tube 3 mounted on the housing 2. Fixing of the parts to be fitted last can also be effected by a sweating process, which is less thermally damaging than a soldering process.

We claim:

1. A valve having parts that are heat-sensitive above a limit temperature, a housing and at least one connecting tube to which a pipe is arranged to be soldered using local heating, the connecting tube comprising a deep-drawn part and consisting of a material of such low thermal conductivity that the heat-sensitive parts remain below the limit temperature as the heat required for soldering is applied, and including a flange on the connecting tube conforming to the housing and with which the connecting tube is soldered to the housing.

2. A valve according to claim 1, in which the connecting tube consists of a material having a thermal conductivity below 80 W/°K·m.

3. A valve according to claim 2, in which the connecting tube consists substantially of stainless steel.

4. A valve according to claim 1, in which the connecting tube is of hollow-cylindrical construction at its free end, and carries a layer of solder on its face facing a pipe which is to be pushed into or onto the free end.

5. A valve according to claim 1, in which the housing consists of the same material of low thermal conductivity as the connecting tube.

6. A method for producing a soldered joint between a valve connecting tube and a pipe according to claim 1, in which a connecting tube of low thermal conductivity is deep-drawn from a blank coated on one side with a layer of cooper, a flange is provided on the connecting tube, the flange conforming to the housing, and then at least one said connecting tube is soldered to the housing by soldering the flange to the housing, the heat-sensitive parts are then introduced and finally the pipe is soldered to the connecting tube.

* * * * *